US005858236A

United States Patent [19]

Dudley

[11] Patent Number: 5,858,236

[45] Date of Patent: Jan. 12, 1999

[54] SCREEN FOR WRINGER ASSEMBLY

[76] Inventor: Robert H. Dudley, 1033 Essex Cir., Kalamazoo, Mich. 49008

[21] Appl. No.: 840,478

[22] Filed: Apr. 21, 1997

Related U.S. Application Data

[62] Division of Ser. No. 602,970, Feb. 16, 1996, Pat. No. 5,720,877.

[51] Int. Cl.[6] ............................ B01D 33/00; B01D 29/56

[52] U.S. Cl. .......................... 210/499; 210/232; 210/348; 210/360.1; 210/373; 210/380.1; 494/36

[58] Field of Search ................................ 210/232, 360.1, 210/373, 380.1, 499, 348; 494/36

[56] References Cited

U.S. PATENT DOCUMENTS

| | | | |
|---|---|---|---|
| 3,491,888 | 1/1970 | Colburn et al. | 210/380.1 |
| 4,253,960 | 3/1981 | Dudley et al. | 210/380.1 |
| 5,242,583 | 9/1993 | Thomas | 210/499 |
| 5,476,588 | 12/1995 | Nagaoka | 210/499 |
| 5,558,770 | 9/1996 | Cope et al. | 210/380.1 |

*Primary Examiner*—David A. Reifsnyder
*Attorney, Agent, or Firm*—Bliss McGlynn, P.C.

[57] ABSTRACT

A wringer bowl assembly is fabricated from a base plate, a top plate, and a plurality of side faces extending therebetween. The side faces extend through a single plane eliminating all need to work the side faces to create a bowl. Each of the side faces includes a an output hole which is where a fluid mixture is separated into its fluid and solid components. Screens extend across the output holes to prevent the solid component of the fluid mixture from passing therethrough. Face plates cover the side faces protecting the side faces from wear due to the movement of the solid component along the sides of the wringer bowl assembly. Each of the face plates includes at least one blade which aids the movement of the fluid mixture from the base plate to the output holes to be separated.

1 Claim, 2 Drawing Sheets

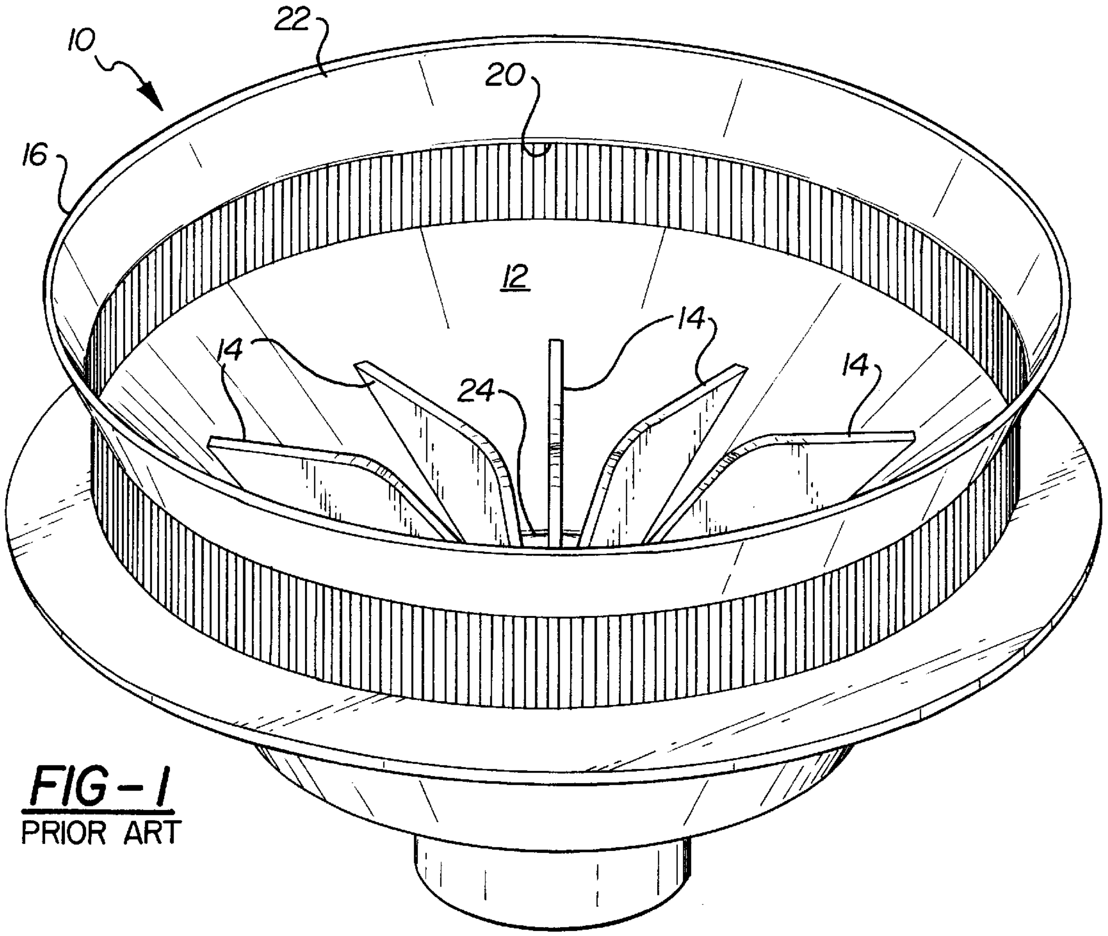
FIG-1
PRIOR ART
FIG-3
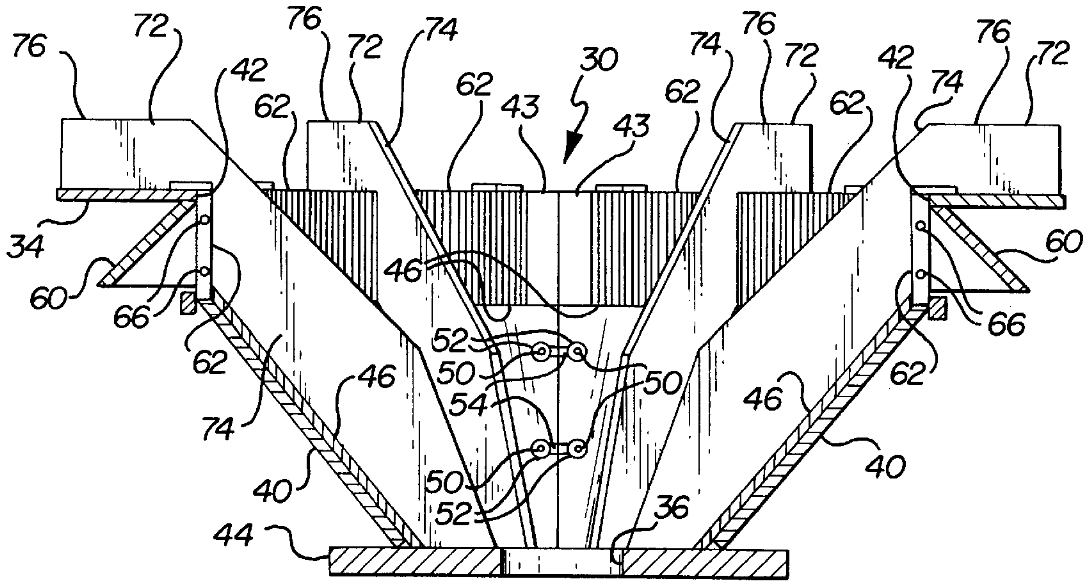

SCREEN FOR WRINGER ASSEMBLY

This is a division of the U.S. patent application Ser. No. 08/602,970, filed: Feb. 16, 1996, now U.S. Pat. No. 5,720, 877.

BACKGROUND OF THE INVENTION

1. Field of the Invention

The invention relates to centrifuges used to remove solid particles from a fluid. More specifically, the invention relates to wringer bowl assemblies used by the centrifuges.

2. Description of the Related Art

Centrifuges are used to remove lubrication-impregnated metal chips or shavings from a lubrication liquid or fluid mixture. Common to all of the centrifuges used for this heavy duty separation procedure is the wringer bowl. The wringer bowl receives the fluid mixture. The fluid mixture then moves up the side of the wringer bowl due to the centrifugal force created by the wringer bowl as it rotates about its axis. As the fluid mixture rises, it reaches a gap in the side wall structure allowing the fluid to pass through the gap. A circular screen prevents the lubrication-impregnated metal chips or shavings from passing through the gap. These chips or shavings then move up the remaining portion of the wringer bowl and are discharged appropriately. A centrifuge and wringer bowl are disclosed in a copending patent application, U.S. Ser. No. 08/563,675.

A significant problem with the use of a wringer bowl having a single side wall is that the material used to fabricate the wringer bowl must be soft enough to be worked or formed in the shape of a bowl. The maximum hardness of the material which is formed into a wringer bowl cannot exceed AR-235, a Bernel hardness. Often times, the chips or shavings have a greater hardness resulting in substantial wear in the wringer bowl due to the constant movement of materials having a greater hardness than the hardness of the wringer bowl. The cost in replacing a wringer bowl having a single side wall is great due to the machinery required to form the wringer bowl. Further, extensive time is required to replace the wringer bowl, resulting in lost production time.

SUMMARY OF THE INVENTION

Accordingly, a wringer bowl assembly for use with a fluid recovery for use with a fluid recovery centrifuge having a rotatable shaft is disclosed. The centrifuge separates solid particulate from a fluid mixture. The wringer assembly includes a top plate defining a center hole to drop the fluid mixture therethrough. A plurality of side faces extended downwardly from the top plate. A plurality of output holes extend along at least a portion of the plurality of side faces. A base plate is fixedly secured to each of the plurality of side faces preventing the fluid mixture from flowing therepast. The base plate is removably securable to the rotatable shaft of the fluid recovery centrifuge such that the wringer bowl assembly is rotated by the rotatable shaft.

One advantage associated with the invention is the use of a plurality of side faces, each of which are individually replaceable. Another advantage associated with the invention is the overall increased hardness of the wringer bowl assembly because the wringer bowl assembly is not formed. The wringer bowl assembly may be assembled using materials harder then that which was previously used to form a wringer bowl having a unitary structure.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 1 is a perspective view of one embodiment of a wringer bowl of the prior art;

FIG. 3 is an exploded perspective view of the embodiment of FIG. 2.

DETAILED DESCRIPTION OF THE PREFERRED EMBODIMENT(S)

Figure 2:
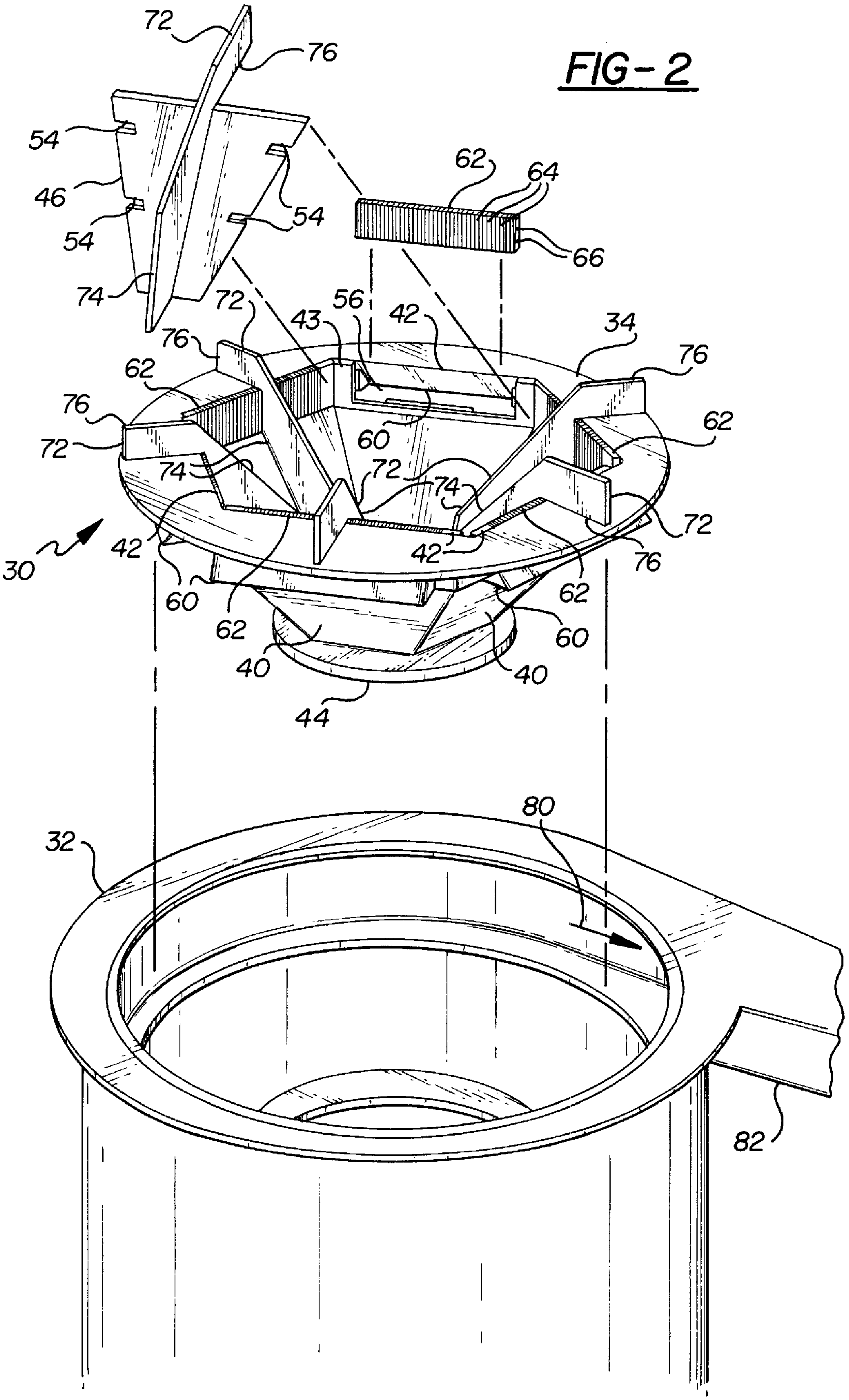
FIG. 2 is a cross-sectional side view of one embodiment of the invention.

Referring to FIG. 1, a prior art wringer bowl is generally indicated at 10. The prior art wringer bowl 10 is formed from a single piece of metal 12 having a hardness less than or equal to AR-235. The metal is formed to be a bowl of unitary structure which resembles frustum from a side view. At least one blade 14 extends along a portion of the single side wall 16 of the bowl 12. A circular screen 20, also of unitary construction, extends around the outer periphery of the bowl 12. Fluid which is dropped into the bowl 12 is pushed up through the circular screen 20. Chips and other debris (not shown) extend upwardly along a circular shoulder 22 whereafter the chips are disposed of in a manner appropriate for the environment in which the centrifuge is installed. It is the single side wall 16 of the bowl 12 which is a disadvantage to the prior art. More specifically, the single side wall 16 and bottom 24 of the bowl 12 are formed from machines which require substantial mass and size to work the metal to the final design.

Referring to FIGS. 2 and 3, a wringer bowl assembly according to the invention is shown generally at 30. The wringer bowl assembly 30 is used with a fluid recovery centrifuge 32 having a rotatable shaft (not shown) to separate the solid particulate, i.e., chips and shavings, from a fluid mixture wherein the fluid is typically a lubrication oil.

The wringer bowl assembly 30 includes a top plate 34. The top plate 34 defines a center hole through which the fluid mixture is dropped. The center hole may be a circle or, as may be appreciated when viewing the Figures, may be a multi-sided hole. Regardless of the number of sides defining the center hole of the top plate 34, the center hole and top plate 34 are symmetric about the rotatable shaft or the shaft housing 36 which receives the rotatable shaft therein.

Extending down from the top plate 34 is a plurality of side faces 40. Each of the side faces 40 are fixedly secured to the top plate 34. Further, the side faces 40 are secured to the top plate 34 in such a manner that there is not gap therebetween along any seam created at the joining surface 42 defined by the line created by the insertion of the side faces 40 and the top plate 34. In one embodiment, the plurality of side faces 40 would include two semi-circular side faces which would be mirror images of each other. In the preferred embodiment, however, there exists more than two side faces, namely six side faces, allowing for the side faces 40 to extend through a single flat plane. Because each of the side faces 40 extend in a single plane, the work required to fabricate a wringer bowl assembly 30 is almost non-existent. More specifically, the metal used to fabricate each of the side faces 40 and the top plate 34 does not have to be bent, formed, worked in any way to create a bend therein. Each of side faces 40 also includes an extension 43 which extends upwardly toward the top plate 34.

A base plate 44 is fixedly secured to each of the plurality of side faces 40 in a manner similar to that which secures the top plate 34 to the side faces 40. The base plate 44 includes the shaft housing 36 which is formed therein or, in an alternative embodiment, fixedly secured thereto. The base plate 44 prevents the fluid mixture from flowing therepast. The shaft housing 36 which receives the rotatable shaft therein and allows the wringer bowl assembly 30 to be rotated by the rotatable shaft. The wringer bowl assembly 30 is secured to the rotatable shaft. The base plate 44, the plurality of side faces 40 and the top plate 34 are all fixedly secured to each other through welding or some other means for securing metal to each other.

The wringer bowl assembly 30 also includes a plurality of face covers 46. Each of the face covers 46 is removably securable to each of the plurality of side faces 40. In one embodiment, the face covers 46 are secured to the side faces 40 using bolts 50 which extend out from the side faces 40 and nuts 52 which threadingly engages the bolts 50. Recesses 54 receive the bolts 50 therethrough. The recesses may be holes or slots which allow the positioning of the face covers 46 on the side faces 40. The face covers 46 are removable and replaceable. Upon the wear and tear of the face cover 46 to an extend such that it is no longer operative the face cover 46 may be replaced. The face cover 46 is a relatively inexpensive piece of equipment because it is a single sheet of metal extending in a single plane requiring minimal work to create. The face covers 46 extend over a portion of each of the plurality of side faces 40.

The side faces 40 each include an output hole 56 to allow fluid to pass therethrough. The output hole 56 extends over a portion of the side face 40 in a position adjacent the top plate 34. In one embodiment, the output hole 56 extends through the extension 43 of the side face 40.

Deflecting shields 60 deflect the fluid as it passes through the output holes 56 in an downward direction. Because the fluid is moving up the face covers 46 due to the centrifugal force created by the rotation of the wringer bowl assembly, the fluid upon reaching the output holes 56 would move out and away from the wringer bowl assembly in a direction parallel to the top plate 34. To minimize the space required to collect the fluid as it exits the wringer bowl assembly 30, the deflectors 60 force the fluid in a downwardly direction. The fluid, as opposed to the chips or shavings, is deflected in a downward direction because it is easier to change the direction of a fluid than metal chips or shavings. More specifically, the deflectors 60 have reduced wear and tear by deflecting fluid as opposed to the redirection of the chips and shavings.

Screening units 62 are used to prevent the chips and shavings from exiting the output holes 56. More specifically, each output hole 56 is covered by a screening unit 62. Because the output holes 56 extend across a flat plane so to do the screening units 62.

The screening units 62 include a plurality of bars 64 which extend along a predetermined length parallel to each other. Each of the bars 64 has a trapezoidal cross-section having first and second parallel surfaces. The first parallel surface is longer than the second parallel surface. The bars 64 are spaced equidistantly from each other such that the plurality of bars 64 allow fluid to pass therethrough and prevent the solid particulate, namely the chips and shavings, from passing therethrough. The screening unit 62 also includes a backing element 66 which extends through a single plane and fixedly secures each of the plurality of bar 64 thereto. The backing element 66 may include a single bar or a plurality of bars extending across or through the bars 64 in a direction generally perpendicular to the bars 64.

Each of the face covers 46 includes a blade 72 which is fixedly secured to the face cover 46. The blade 72 extends upwardly therealong beyond the face cover 46. More specifically the blade 72 extends over the top plate 34 when the face cover 46 is secured to the side face 40. The blade 72 includes a primary arm 74 and secondary arm 76. The primary arm 74 extends up along the face cover 46. The secondary arm 76 extends along the top place 34. Therefore, the primary 74 and secondary 76 arms define and angle therebetween. The secondary arm 76 aids in the creation of air flow, generally indicated by arrow 80, to help force the chips and shavings through a dispatch housing 82 where the chips and shavings may be collected and discarded accordingly. The blade 72 extends along the longitudinal axis of the face cover 46. The blade 72 extends along the longitudinal axis, i.e., the center, to maintain equilibrium in the wringer bowl assembly 30 as it rotates. The blade 72 aid in the movement of the fluid mixture up from the base plate 44 to the subsequent separation at the output holes 56 and the eventual discharge of the chips and shavings out the discharge housing 82. In an alternative embodiment, the face covers 46 may include more than one blade 72 fixedly secured thereto in a symmetric fashion.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A screening unit to cover a hole having a width and a length in a side face of a wringer bowl, said screening unit comprising: a plurality of bars having a predetermined length equal to the width of the hole in the side face of the wringer bowl; and a backing element having a predetermined length equal to the length of the hole in the side face of the wringer bowl and extending in a single plane fixedly secured to each of said plurality of bars to space each of said plurality of bars equidistantly from each other such that said plurality of bars allows fluid to pass therethrough and prevents solid particulate from passing therethrough.

* * * * *